April 14, 1964   O. J. PARKER   3,128,845
DESPIN WEIGHT RELEASE
Filed July 31, 1962   2 Sheets-Sheet 1
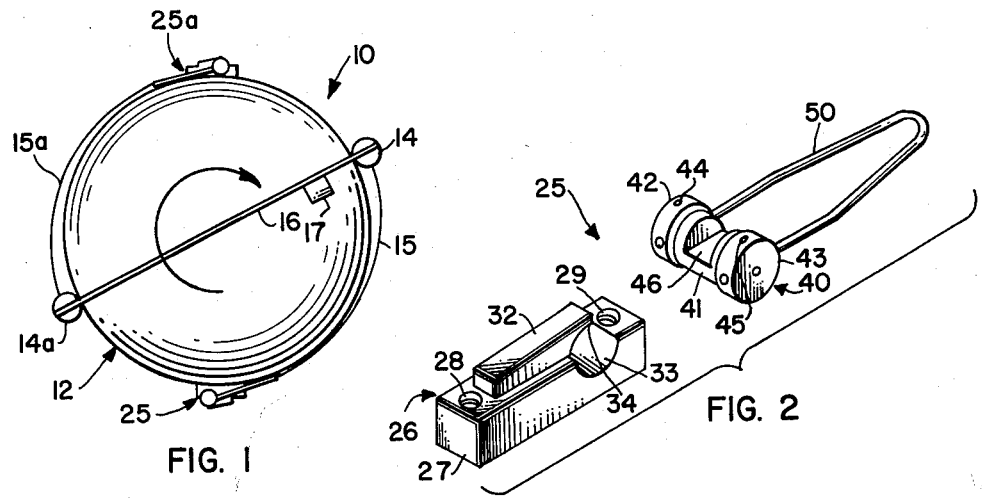
FIG. 1
FIG. 2
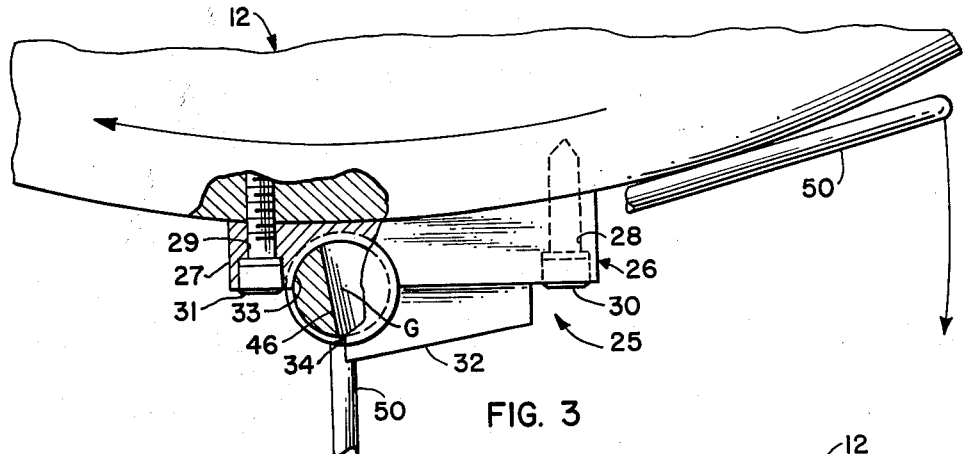
FIG. 3
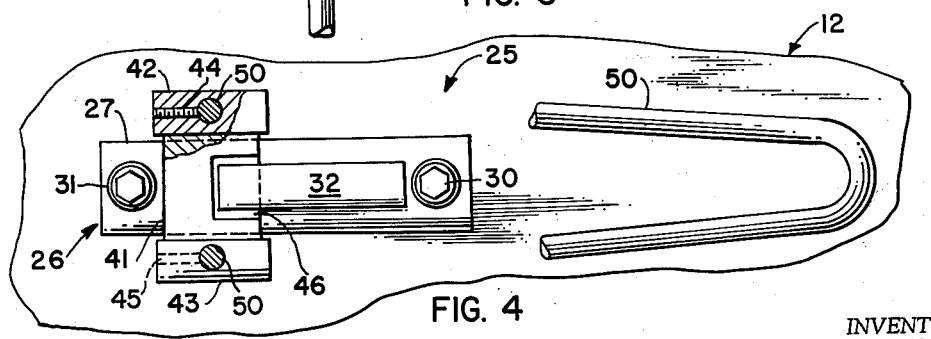
FIG. 4
INVENTOR
OTIS J. PARKER
BY
ATTORNEY United States Patent Office 3,128,845
Patented Apr. 14, 1964

3,128,845
DESPIN WEIGHT RELEASE
Otis J. Parker, Portsmouth, Va., assignor to the United States of America as represented by the Administrator of the National Aeronautics and Space Administration
Filed July 31, 1962, Ser. No. 213,836
8 Claims. (Cl. 188—1)
(Granted under Title 35, U.S. Code (1952), sec. 266)

The invention described herein may be manufactured and used by or for the Government of the United States of America for governmental purposes without the payment of any royalties thereon or therefor.

This invention relates to a despin weight release, and more particularly to a release assembly whereupon weights and cables utilized for despinning are released automatically when they assume a predetermined position with respect to a body.

It is now common practice to use a spin stabilization on launch vehicles to maintain orbit injection angles to within specific tolerances. As satellite and probe experiments become more complex, however, payloads with a required spin rate much lower than that required for stabilization at injection or a nonspinning platform is required. In order to be able to utilize spin stabilization for the initial injection and still have reduced spin rate or a nonspinning platform, some method of despin must be utilized. One mechanism used for despin is that of retrojets. Although this system operates satisfactorily, it requires an accurate knowledge of the initial spin rate and the moment of inertia about the spin axis for achieving either a fractional reduction in spin or complete despin. Furthermore, the system is rather complicated requiring a propulsion structure as well as a fuel supply for the propulsion unit. Mechanism is needed to ignite and control the retrojets, all of which adds to the weight and complexity of the retrojet system.

In view of the difficulties encountered with the retrojet system, other methods of despin have been proposed. One of the most effective, accurate, and inexpensive methods of removing a portion of all of the angular momentum from a spinning body in space is the Yo-Yo method of despin. This system is completely independent of initial spin rate when a reduction to zero spin is required, and thereby greatly adds to the simplicity of the system. The accuracy in achieving zero spin is dependent on the accuracy of the physical constants involved, such as the moment of inertia, length and mass of the cable, mass of the attached weights, and the ability to release the weights at the proper time. Weights and cables utilized in this method are unwound from the spinning body, thus transferring the angular momentum from the body to the weights and cables. The weights and cables are then released from the body at the instant when the desired proportion of the angular momentum has been transferred.

As suggested above, the ability to release the weights at the proper time is of particular concern in utilizing the Yo-Yo method of despin. It is this requirement of release that the instant invention concerns itself with.

Several methods of release have previously been tried, but did not operate satisfactorily. One of the methods tried was to burn a section of the cable by electrical means. This produced too much time delay and unsymmetrical release of the diametrically opposed weights utilized in the Yo-Yo method. Also tried was the use of wedges or plugs in a similarly shaped receptacle. They could be designed to release at the proper instant for a given force on the cable, but the requirements are such that the release mechanism must be dependent only on the position of the weights and cables at a given instant of time. The wedge or plug arrangement would not meet these requirements.

The problem of release of the weights and cables has been solved by the instant invention. The inventive release assembly employs a latch body having a socket formed therein. An escapement is formed in the latch body which communicates with the socket. The weights and cables are attached to a bolt which is operative within the latch body socket. The bolt is so constructed that when it assumes one position it is blocked by the escapement. However, upon assuming another position, it is automatically released from the socket via the escapement. Thus, by calculation, the escapement can be positioned such that the weights and cables are released automatically when the proper amount of momentum has been transferred to the weights and cables to despin or partially despin the space vehicle.

It is, therefore, an object of this invention to provide an improved release structure for utilization with the Yo-Yo method of despin.

A further object of this invention is to provide a release mechanism for weights and cables which is dependent only upon the position of the weights and cables.

Yet another object of this invention is to provide a release mechanism which can be constructed to release weights and cables at various positions with respect to the spinning body and thereby provide various degress of despin.

Still another object of this invention is to provide a release mechanism for cables and weights which will release these members at an angular relationship with respect to the spinning vehicle within a fraction of a degree.

Yet another object of this invention is to provide a release mechanism which is of extremely simple design, having a minimum number of parts, and being very light in weight.

Another object of this invention is to provide a release mechanism which is easy to construct in accordance with a calculated formula of despin necessitating a particular cable and weight arrangement.

Yet another object of this invention is to provide a release mechanism which is easily attached to a space vehicle and to the weights and cables utilized to despin the vehicle.

These and other objects and advantages of this invention will become more apparent upon reading the specification in conjunction with the accompanying drawings.

In the drawings:

FIG. 1 is an elevational view showing a Yo-Yo type despin assembly utilizing the release mechanisms of this invention;

FIG. 2 is an exploded, perspective view of a release assembly;

FIG. 3 is a segmental view showing a release assembly in elevation, partially cut away to reveal the relationship of the bolt with respect to the latch body;

FIG. 4 is a plan view of the release assembly, partially cut away to show attachment means for the assembly bail;

Figure 5A:
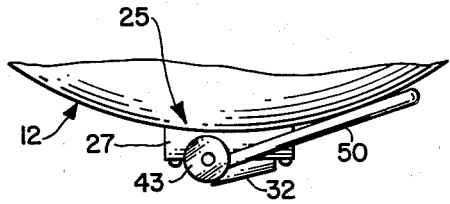
FIG. 5 ($a$ through $f$) shows the release sequence of the release assembly.

Basically, this invention pertains to a release assembly which can be utilized with the Yo-Yo system for despinning an orbital mass. The release assembly includes a latch body which is adapted to be fixed to an orbital mass. The latch body has a socket or pocket formed therein. A section of the latch body is removed to form an opening or escapement which communicates with the pocket. A latch bolt is rotatably mounted in the pocket and has fixed thereto a bail which provides means for connecting the release assembly to a cable and weight. The latch bolt has a slot cut therein which is dimensioned such that when the bolt is in one angular position with respect to the latch body its dimension is greater than the largest dimension of the escapement and is thereby blocked by the escapement. However, when the latch bolt assumes an angular position essentially 90° from the first mentioned position the dimension of the bolt is less than the greatest dimension of the escapement providing an arrangement whereby the bolt is freely released together with the cable and weight attached thereto.

Referring now more specifically to the details of the invention, FIG. 1 shows the despin assembly, designated generally by the reference numeral 10. The despin assembly 10 includes generally weights and cables 14 and 15 respectively, and release assemblies 25 which have generally a latch body 27, latch bolt 40 and bail 50.

For purposes of illustration, the despin assembly 10 is shown affixed to a spatial body which in actual practice might be a satellite, space platform, space vehicle or some other mass used for a space experiment. Weights 14 and 14a having cables 15 and 15a are secured adjacent the body 12 by a restraint band 16. The restraint band 16 is essentially a metal wire which surrounds the space body and is tied together at its ends. The wire overlaps the cables or weights holding them in position against the spatial body 12. The restraint band 16 is severed just prior to the despin operation to loosen the cables and weights. The restraint band 16 is severed by an electrical burning circuit, shaped charge or other conventional cutting technique 17, illustrated diagrammatically in FIG. 1.

As shown in FIG. 1, one end of the cables 15 and 15a is attached to the weights 14 and 14a respectively. The other ends of the cables are attached to the release assemblies 25 and 25a respectively. The release assemblies 25 and 25a are located at diametrically opposed points on the space body to provide a symmetrical transfer of momentum from the space body to the cables and weights. For purposes of illustration, only the release assemblies 25 and 25a are shown associated with their respective weights and cables in FIG. 1; however, it is to be understood that within the broadest aspect of the invention, additional assemblies may be added as the size of the space vehicle increases.

FIGS. 2 through 4 show the various details of the release assembly 25 now to be described. The release assembly 25 includes a latch 26 and bolt 40.

The latch 26 has a body 27 which is a rectangular, block-like member. The body 27 also has a raised, rib portion 32 which is narrower than the body proper for purposes which will be explained more fully hereinafter. A pocket or socket 33 is formed transversely through the body 27 including the rib 32. A section of the rib 32 is removed, such as by machining, to form an opening or escapement 34 which communicates with the pocket 33. The latch body 27 is provided with apertures 28 and 29 which receive fasteners 30 and 31 respectively, used to fix the release assembly to the space body as shown in FIG. 3.

The latch bolt 40 is of a cylindrical design having a shank portion 41 and enlarged ends 42 and 43. The bolt shank 41 has a diameter slightly less than the diameter of the pocket 33 such that it is freely rotatable therein. The length of the shank 41 is essentially that of the width of a latch body 27, the enlarged ends 42 and 43 of the bolt abut the sides of the latch body 27 thereby preventing endwise movement of the bolt. The bolt shank 41 also has a release slot 46 formed therein as best illustrated in FIGS. 2 and 3. The release slot 46 has a depth of approximately one half the diameter of the bolt shank 41. The bolt ends 42 and 43 are provided with bores which receive the respective ends of a generally U-shaped bail 50. The bail 50 is fixed to the bolt 40 by transversely disposed set screws 44 and 45, shown in FIG. 4.

The leading edge of the slot 46 and the surface of the escapement 34, which register upon initial release, may be provided with a small radius to prevent any tendency of the bolt to stick or hang up. These radii are in the range of .030 inch which are too small to illustrate on the drawings.

The slot 46, as clearly illustrated in FIG. 3, is undercut such that after initial release there is no further contact with the release point on rib 32 of the latch body. The opposed circular portion of the bolt also loses all physical contact with the latch immediately after release due to the design of the escapement 34. The portion of the escapement formed by the body other than the rib 32 terminates above the geometric center G of the bolt (as viewed in FIG. 3) thereby facilitating such a release. Thus, it is clear that the entire bolt 40 loses all physical contact with the latch 26 immediately after initial release.

*Operation*

In operation, it is first necessary to loosen the weights and cables 14, 14a, 15, and 15a. This is accomplished by energizing the cutter 17 which severs the restraint band 16. Since the space body is spinning, the weights and cables will start to move away from the space body causing the restraint band to fall away. As the weights and cables move away from the space body, the momentum thereof is transferred to these members according to the principles of the Yo-Yo despin system. Since the cables are attached to the bails of the release assemblies 25, and the bails are in turn affixed to the latch bolts, the bolts will rotate or move within the sockets of the release assemblies.

Figure 5B:
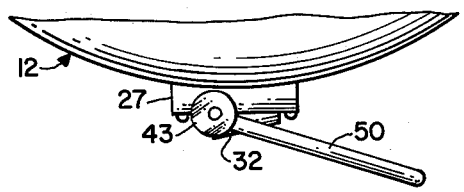
Figure 5C:
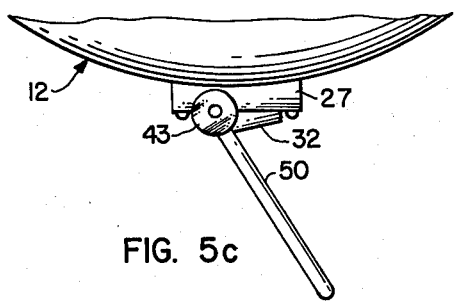
Figure 5D:
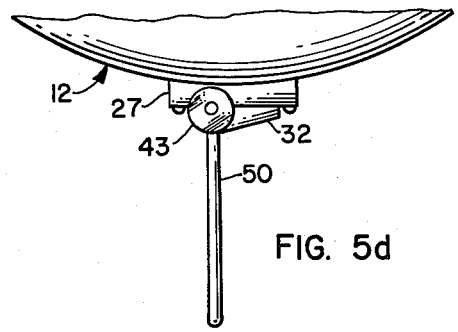
Figure 5E:
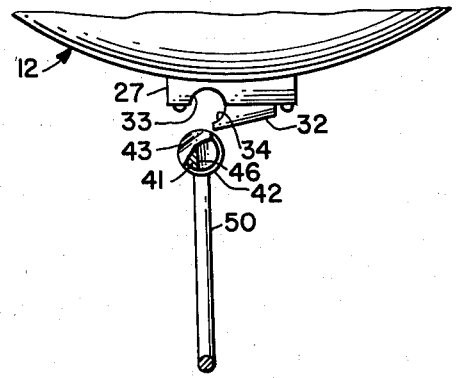
Figure 5F:
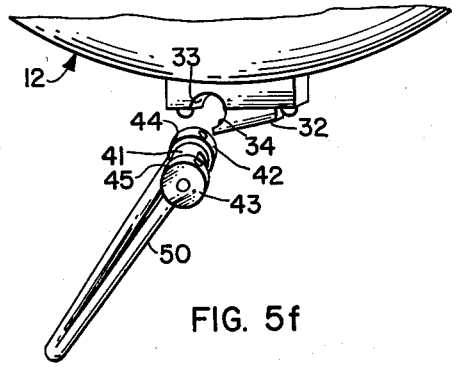

As shown in the sequence of release FIG. 5 (a through f), in the initial phases of the release FIGS. 5a through 5d, the dimension of the bolt shank 11 in the positions assumed is greater than the largest dimension of the escapement 34 and is blocked thereby. However, when the weights and cables have rotated the latch bolt to a position wherein the slot formed in the bolt registers with the escapement, the dimension of the bolt shank is less than the largest dimension of the escapement. Due to the centrifugal force applied by the weights and cables to the bails, an automatic release of the bolts occurs together with the release of the weights and cables when the slots of the bolts register with the escapements.

By calculation, it can be determined at what angular position of the bolt with respect to the latch body it is desirable to release the weights and cables. This may vary depending on the degree of space body despin necessary to fulfill the experiment. Nevertheless, once this point has been determined, it is only necessary to form the escapement or opening 34 such that the slot 36 in the latch bolt registers at this position. It has been determined that this structure will release a weight and cable within a plus or minus ¼ degree of angulation.

From the above description, it can be seen that the release assembly which forms this invention is limited in its accuracy as to point of release only by the accuracy of formation. Since it is possible to machine to very close tolerances, the device is extremely accurate. Furthermore, each release assembly can be formed such that it releases simultaneously which is an essential requirement in using the Yo-Yo method of despin. Release is dependent only on position, and not on force of the cable, initial spinning rate of the vehicle or residual spinning weight of the vehicle. Obviously, it is extremely simple, has a very high reliability and is inexpensive. Release is possible at any desired angle to provide various degrees of despin. Also, due to the extreme simplicity of the release assembly, weight is reduced to a minimum which is highly desirable in the space program and in many instances a necessity.

Since there are, obviously, many modifications and variations of the present invention possible in the light of the above teachings, it is therefore to be understood that, within the scope of the appended claims, the invention may be practiced otherwise than as specifically described.

What is claimed as new and desired to be protected by Letters Patent of the United States is:

1. A despin mechanism comprising: a body, release assemblies fixed to said body, said release assemblies having latch means, bolt means retained by and movable relative to said latch means and having a connection with said weight and cable means, bolt means being moved by the transfer of momentum to said weight and cable means upon despin, said latch means simultaneously and instantaneously releasing said bolt means upon a predetermined angular relationship therebetween, and said bolt and latch means being so constructed and arranged so that said bolt means upon reaching the point of release immediately loses all physical contact with said latch means.

2. A despin mechanism comprising: a body; release assemblies fixed at diametrically opposite points on said body; said release assemblies having latch means, sockets formed in said latch means, bolt means rotatably mounted in said socket means and being connected to cable and weight means, said latch means simultaneously and instantaneously releasing said bolt means upon their assuming a predetermined angular relationship with respect to said escapement means as a result of the transfer of momentum of said body to said cable and weight means, said bolt means and escapement means being so constructed and arranged that said bolt means upon reaching the point of release immediately loses all physical contact with said latch means.

3. A despin mechanism comprising: a body capable of being placed in orbit and requiring despinning, release assemblies fixed at diametrically opposite points on said body; said release assemblies having latch elements, a socket formed in said latch elements, a section of said latch elements being removed to form openings communicating with said sockets, bolts rotatably located in said sockets and being connected to cable and weight means, slots formed in said bolts, said latch elements simultaneously and instantaneously releasing said bolts upon the slots therein registering with the openings in said latch elements as a result of the transfer of momentum of said body to said cable and weight means, and the opening in said latch elements and the slots in said bolts being formed such that said bolts upon reaching the point of release immediately lose all physical contact with said latch elements.

4. A despin mechanism as in claim 3 wherein said openings in said latch elements are formed to register with the bolt slots such that release occurs when the spin of the body is approximately zero.

5. A despin mechanism as in claim 3 including means whereby said openings in said latch elements are formable at various positions to facilitate release of said bolts at various points with respect to said body.

6. A despin mechanism as in claim 3 wherein the ends of said bolt are enlarged and abut the sides of said latch body to prevent endwise movement of said bolt.

7. A despin mechanism as in claim 6 wherein the enlarged ends of said bolt receive and retain a bail adapted to connect to said cable and weight means.

8. A release assembly adapted for use in despinning an orbital mass comprising: a latch body, a pocket formed in said latch body, escapement means formed in said latch body and communicating with said pocket, a member operative in said pocket, said member in one position having a dimension greater than the largest dimension of said escapement means and being blocked thereby, said member in another position having a dimension less than said escapement means dimension and being freely movable therethrough, said latch body and member being shaped such that at the point of release said member immediately loses all physical contact with said latch body.

References Cited in the file of this patent

UNITED STATES PATENTS

| | | |
|---|---|---|
| 925,910 | Hoke | June 22, 1909 |
| 1,496,466 | Jackson | June 3, 1924 |
| 1,994,805 | Barfod | Mar. 19, 1935 |
| 3,030,049 | Pilkington et al. | Apr. 17, 1962 |

OTHER REFERENCES

Astronautics publication, June 1960, vol. 5, No. 6, pages 38, 39 relied on.